(12) United States Patent
Shinomoto et al.

(10) Patent No.: US 9,628,003 B2
(45) Date of Patent: Apr. 18, 2017

(54) DIRECT CURRENT POWER SUPPLY DEVICE, MOTOR DRIVING DEVICE, AIR CONDITIONER, AND REFRIGERATOR

(71) Applicant: Mitsubishi Electric Corporation, Tokyo (JP)

(72) Inventors: Yosuke Shinomoto, Tokyo (JP); Kazunori Hatakeyama, Tokyo (JP); Shota Kamiya, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/029,648

(22) PCT Filed: Oct. 18, 2013

(86) PCT No.: PCT/JP2013/078298
§ 371 (c)(1),
(2) Date: Apr. 15, 2016

(87) PCT Pub. No.: WO2015/056340
PCT Pub. Date: Apr. 23, 2015

(65) Prior Publication Data
US 2016/0248352 A1    Aug. 25, 2016

(51) Int. Cl.
*H02H 7/08* (2006.01)
*H02P 6/12* (2006.01)
(Continued)

(52) U.S. Cl.
CPC ............... *H02P 6/12* (2013.01); *F25B 31/02* (2013.01); *H02H 7/1213* (2013.01); *H02K 1/02* (2013.01);
(Continued)

(58) Field of Classification Search
USPC .................. 318/400.21, 563, 400.22, 400.27; 363/56.03, 125, 126, 108, 56.07, 56.1
See application file for complete search history.

(56) References Cited

U.S. PATENT DOCUMENTS

| 5,430,639 A | 7/1995 | Takahashi |
| 6,137,700 A * | 10/2000 | Iida ..................... H02M 1/4208 323/282 |

(Continued)

FOREIGN PATENT DOCUMENTS

| EP | 2164161 A2 * | 3/2010 | ............ H02M 7/217 |
| JP | 58-204770 A | 11/1983 | |

(Continued)

OTHER PUBLICATIONS

U.S. Appl. No. 14/787,527, filed Oct. 28, 2015, Kamiya et al.
(Continued)

*Primary Examiner* — Jorge L Carrasquillo
(74) *Attorney, Agent, or Firm* — Posz Kaw Group, PLC (57) ABSTRACT

A direct-current power supply device includes a rectifier connected to a power supply, a charge storage unit configured by a first capacitor and a second capacitor connected in series, a switching unit configured by a first switching element 4a and a second switching element connected in series and backflow preventing elements that suppress a backflow of electric charges from the charge storage unit, a reactor, a control unit that controls operations of the first switching element and the second switching element, and a direct-current-voltage detecting unit that detects a first both-end voltage, which is a voltage across the first capacitor, and a second both-end voltage, which is a voltage across the second capacitor. The control unit detects, on the basis of a voltage difference between the first both-end voltage and the (Continued)

second both-end voltage, a short-circuit failure of one of the first switching element and the second switching element.

22 Claims, 8 Drawing Sheets

(51) Int. Cl.
    *H02M 1/32* (2007.01)
    *H02M 3/158* (2006.01)
    *H02M 7/217* (2006.01)
    *F25B 31/02* (2006.01)
    *H02H 7/12* (2006.01)
    *H02K 1/02* (2006.01)
    *H02K 1/27* (2006.01)
    *H02M 7/06* (2006.01)
    *H02P 29/024* (2016.01)
    *H02M 1/00* (2006.01)
    *H02M 3/155* (2006.01)

(52) U.S. Cl.
    CPC .............. *H02K 1/27* (2013.01); *H02M 1/32* (2013.01); *H02M 3/158* (2013.01); *H02M 7/06* (2013.01); *H02M 7/2176* (2013.01); *H02P 29/027* (2013.01); *H02M 2001/007* (2013.01); *H02M 2001/325* (2013.01); *H02M 2003/1552* (2013.01)

(56) References Cited

U.S. PATENT DOCUMENTS

| | | | |
|---|---|---|---|
| 6,181,583 B1 * | 1/2001 | Okui | H02M 1/4208 363/45 |
| RE39,060 E | 4/2006 | Okui et al. | |
| 7,274,579 B2 * | 9/2007 | Ueda | H02M 5/458 363/125 |
| 7,403,400 B2 | 7/2008 | Stanley | |
| 7,576,299 B2 | 8/2009 | Rossetto et al. | |
| 8,269,141 B2 | 9/2012 | Daniel et al. | |
| 8,278,896 B2 | 10/2012 | Horii | |
| 8,581,147 B2 | 11/2013 | Kooken et al. | |
| 8,823,303 B2 | 9/2014 | Shinomoto et al. | |
| 2006/0175313 A1 | 8/2006 | Kooken et al. | |
| 2010/0181946 A1 * | 7/2010 | Ogasawara | H02M 3/1582 318/139 |
| 2011/0019452 A1 * | 1/2011 | Shinomoto | H02M 1/4208 363/126 |
| 2013/0194698 A1 * | 8/2013 | Sase | H02M 1/4258 360/75 |

FOREIGN PATENT DOCUMENTS

| | | |
|---|---|---|
| JP | 58-207870 A | 12/1983 |
| JP | 03-003189 U | 1/1991 |
| JP | 03-101187 U | 10/1991 |
| JP | H05-328729 | 12/1993 |
| JP | 06-253540 A | 9/1994 |
| JP | 08-186981 A | 7/1996 |
| JP | 08-237957 A | 9/1996 |
| JP | 2539158 Y2 | 4/1997 |
| JP | 10-174442 A | 6/1998 |
| JP | 2000-146392 A | 5/2000 |
| JP | 2000-278955 A | 10/2000 |
| JP | 2000-324843 A | 11/2000 |
| JP | 2001-050625 A | 2/2001 |
| JP | 2001-145360 | 5/2001 |
| JP | 2001-286130 A | 10/2001 |
| JP | 2002-176778 A | 6/2002 |
| JP | 2004-023948 | 1/2004 |
| JP | 2004-180422 A | 6/2004 |
| JP | 2005-045995 A | 2/2005 |
| JP | 2005-110491 A | 4/2005 |
| JP | 2005-323440 A | 11/2005 |
| JP | 2006-026736 A | 2/2006 |
| JP | 2006-223092 A | 8/2006 |
| JP | 2006-271185 A | 10/2006 |
| JP | 2006-325306 A | 11/2006 |
| JP | 2007-166783 A | 6/2007 |
| JP | 2008-012586 A | 1/2008 |
| JP | 2008-295228 A | 12/2008 |
| JP | 2009-050109 A | 3/2009 |
| JP | 2009-273230 A | 11/2009 |
| JP | 4460572 B2 | 2/2010 |
| JP | 2010-068642 A | 3/2010 |
| JP | 2010-263739 A | 11/2010 |
| JP | 2011-036020 A | 2/2011 |
| JP | 2011-061887 A | 3/2011 |
| JP | 2011-244635 A | 12/2011 |
| JP | 2012-060801 A | 3/2012 |
| JP | 2012-165539 A | 8/2012 |
| JP | 2012-191761 | 10/2012 |
| JP | 2012-231646 A | 11/2012 |
| JP | 5087346 B2 | 12/2012 |
| JP | 2013-038921 A | 2/2013 |
| JP | 2013-110839 A | 6/2013 |
| JP | 2013110839 A * | 6/2013 |
| JP | 5274579 B2 | 8/2013 |
| WO | 2004/071703 A1 | 8/2004 |
| WO | 2009/028053 | 3/2009 |
| WO | 2013/057857 | 4/2013 |

OTHER PUBLICATIONS

U.S. Appl. No. 14/909,498, filed Feb. 2, 2016, Hatakeyama et al.
International Search Report mailed Dec. 10, 2013 in corresponding PCT application No. PCT/JP2013/078298 (with English translation).
International Search Report mailed Oct. 29, 2013 in a related PCT application No. PCT/JP2013/074091 (with English translation).
International Search Report mailed Aug. 6, 2013 in a related PCT application No. PCT/JP2013/067395 (with English translation).
U.S. Appl. No. 15/030,389, filed Apr. 19, 2016, Kamiya et al.
International Search Report mailed Dec. 3, 2013 in a related PCT application No. PCT/JP2013/079288 (with English translation).
Office Action mailed Dec. 13, 2016 issued in corresponding JP patent application No. 2015-544677 (and English translation).
U.S. Patent Office issued Office Action mail date of Feb. 3, 2017 in the related U.S. Appl. No. 15/030,389.
Office Action dated Jan. 31, 2017 issued in the corresponding Canadian patent application No. 2,927,417.

* cited by examiner

DIRECT CURRENT POWER SUPPLY DEVICE, MOTOR DRIVING DEVICE, AIR CONDITIONER, AND REFRIGERATOR

CROSS REFERENCE TO RELATED APPLICATION

This application is a U.S. national stage application of International Patent Application No. PCT/JP2013/078298 filed on Oct. 18, 2013, the disclosure of which is incorporated herein by reference.

TECHNICAL FIELD

The present invention relates to a direct-current power supply device, a motor driving device, an air conditioner, and a refrigerator.

BACKGROUND

There has been described a technology for standardizing 200 volts and 400 volts by comparing a direct-current voltage, which is connected to a commercial three-phase power supply and rectified, with a reference value and operating or stopping a first switching element and a second switching element (e.g., Patent Literature 1). There has been described a technology for storing energy in a reactor and boosting a voltage by continuously setting a period in which a first switching element and a second switching element are simultaneously turned on and off or simultaneously turned on, a period in which only one of the first switching element and the second switching element is turned on, a period in which the first switching element and the second switching element are simultaneously turned on, and a period in which only the other of the first switching element and the second switching element is turned on (e.g., Patent Literature 2).

Concerning a commercial single-phase power supply, there has been described a technology for making it possible to control full-wave rectification and double-voltage rectification and control an input voltage into a wide variety of output voltages by alternately switching two switching elements connected in series (e.g., Patent Literature 3).

Further, there has been described a technology in which boosting chopper units configured by switching elements and reactors inserted in respective phases are connected to a neutral point of a star connecting wire of a multi-phase power supply and the switching elements operate, whereby harmonics are suppressed (e.g., Patent Literature 4).

There has been described a technology for keeping a boosting ratio constant by controlling ON/OFF of a double voltage switch (e.g., Patent Literature 5).

Patent Literature

Patent Literature 1: Japanese Patent Application Laid-Open No. 2008-12586
Patent Literature 2: Japanese Patent Application Laid-Open No. 2009-50109
Patent Literature 3: Japanese Patent Application Laid-Open No. 2000-278955
Patent Literature 4: Japanese Patent Application Laid-Open No. H6-253540
Patent Literature 5: Japanese Utility Model Publication No. H3-3189

In the direct-current power supply devices described in Patent Literatures 1 to 5, output voltages higher than power supply voltages can be obtained. All of the output voltages are obtained by operations by the switching elements. When the switching elements fail, in general, short-circuit breakage occurs. Therefore, in the case of a direct-current power supply device configured by switching elements connected in series, when only one of the switching elements fails, a short-circuit current does not flow in from an alternating-current power supply. Therefore, there is a problem in that the short-circuit current is not detected and protection by a general fuse cannot be performed. Further, when the failure of one switching element cannot be detected and a switching operation is continued, an over-current protection function works at timing when the other switching element is turned on, and thus there is a problem in that the other switching element cannot be turned on and the operation cannot be continued.

SUMMARY

The present invention has been devised in view of the above and it is an object of the present invention to obtain a direct-current power supply device that controls a full-wave rectification state and a boosting state using two switching elements connected in series, the direct-current power supply device being capable of detecting a short-circuit failure of one switching element.

In order to solve the aforementioned problems, a direct-current power supply device according to the present invention is so constructed as to include a rectifier connected to an alternating-current power supply, a charge storage unit including a first capacitor and a second capacitor connected in series, a switching unit including a first switching element and a second switching element connected in series and backflow preventing elements that suppress a backflow of electric charges from the charge storage unit, a reactor, a control unit that controls operations of the first switching element and the second switching element, and a direct-current-voltage detecting unit that detects a first both-end voltage, which is a voltage across the first capacitor, and a second both-end voltage, which is a voltage across the second capacitor, wherein the rectifier and the switching unit are connected via the reactor, and the control unit detects, on the basis of a voltage difference between the first both-end voltage and the second both-end voltage, a short-circuit failure of one of the first switching element and the second switching element.

A direct-current power supply device, a motor driving device, an air conditioner, and a refrigerator of the present invention attain an effect that, in a direct-current power supply device that controls a full-wave rectification state and a boosting state by using two switching elements connected in series, it is made possible to detect a short-circuit failure of one switching element.

DETAILED DESCRIPTION

Embodiments of a direct-current power supply device, a motor driving device, an air conditioner, and a refrigerator according to the present invention are explained in detail below with reference to the drawings. Note that the present invention is not limited by the embodiments.

First Embodiment

Figure 1:
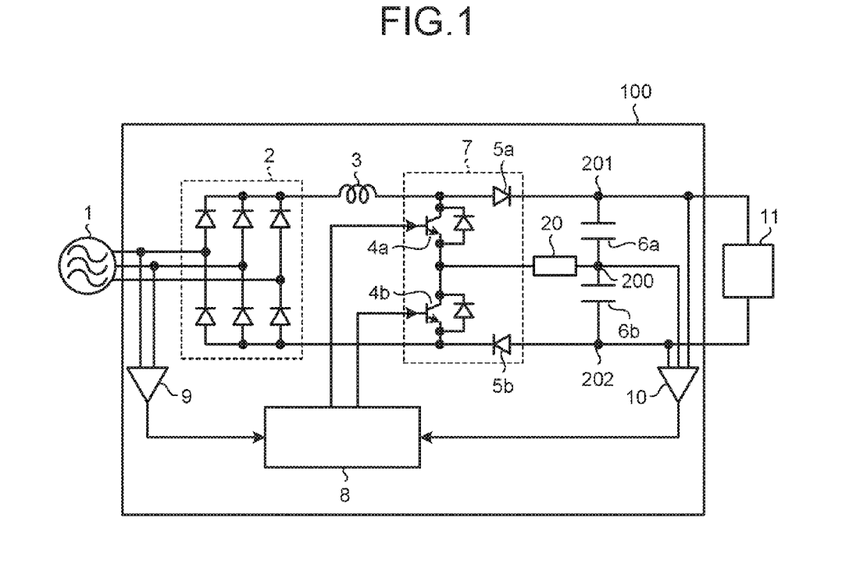
FIG. 1 is a circuit block diagram showing a configuration example of a direct-current power supply device according to a first embodiment.

FIG. 1 is a circuit block diagram showing a configuration example of a first embodiment of a direct-current power supply device 100 according to the present invention. The direct-current power supply device 100 of this embodiment is a power conversion device that converts an alternating current into a direct current. The direct-current power supply device 100 converts a three-phase alternating current supplied from an alternating-current power supply 1 into a direct current and supplies the direct current to a load 11. The load 11 can be any load as long as the load performs power consumption with a direct current. As the load 11, for example, an inverter load that drives a motor of a compressor used in an apparatus to which a refrigeration cycle is applied is assumed. Examples of the apparatus to which the refrigeration cycle is applied include an air conditioner, a freezer, a washer drier, a refrigerator, a dehumidifier, a heat-pump type water heater, and a showcase. The load 11 is not limited to the load of the apparatus to which the refrigeration cycle is applied and can be a load in an apparatus such as a vacuum cleaner, a fan motor, a ventilation fan, a hand drier, an electromagnetic induction heating cooker, and the like.

The direct-current power supply device 100 includes a rectifier circuit (a rectifier) 2 that rectifies a three-phase alternating current, a reactor 3 connected to an output side of the rectifier circuit 2, a first capacitor 6a and a second capacitor 6b connected in series between output terminals to the load 11, a switching unit 7 that selectively charges one or both of the first capacitor 6a and the second capacitor 6b, a control unit 8 that controls the switching unit 7, a power-supply-voltage detecting unit 9 that detects a voltage of a three-phase alternating current, and a direct-current-voltage detecting unit 10 that detects a direct-current voltage output to the load 11. The first capacitor 6a and the second capacitor 6b configure a charge accumulating unit that accumulates electric charges. Note that, in the example shown in FIG. 1, the reactor 3 is connected to the output side of the rectifier circuit 2. However, the reactor 3 can be connected to an input side of the rectifier circuit 2.

The rectifier circuit 2 is a three-phase full-wave rectifier circuit in which six rectifier diodes are full-bridge connected. In the example shown in FIG. 1, the power-supply-voltage detecting unit 9 detects line voltages of two phases (an r phase and an s phase) in the three-phase alternating current supplied from the alternating-current power supply 1.

The switching unit 7 includes a first switching element 4a that switches charging and non-charging of the second capacitor 6b, a second switching element 4b that switches charging and non-charging of the first capacitor 6a, a first backflow preventing element 5a that prevents a backflow to the first switching element 4a of electric charges charged in the first capacitor 6a, and a second backflow preventing element 5b that prevents a backflow to the second switching element 4b of electric charges charged in the second capacitor 6b.

A middle point of a series circuit including the first switching element 4a and the second switching element 4b and a middle point 200 of a series circuit including the first capacitor 6a and the second capacitor 6b are connected, and a neutral-line disconnecting unit 20 (a connection control unit) is disposed between the middle points. The first capacitor 6a is connected to a collector of the first switching element 4a at a connection point 201. The first backflow preventing element 5a is connected in a forward direction toward the connection point 201 between the collector of the first switching element 4a and the connection point 201. The second capacitor 6b is connected to an emitter of the second switching element 4b at a connection point 202. The second backflow preventing element 5b is connected in a forward direction toward the emitter of the second switching element 4b between the emitter of the second switching element 4b and the connection point 202.

The capacities of the first capacitor 6a and the second capacitor 6b are the same. For the first switching element 4a and the second switching element 4b, for example, a semiconductor element such as a power transistor, a power MOSFET (Metal Oxide Semiconductor Field Effect Transistor), or an IGBT (Insulated Gate Bipolar Transistors) is used.

The control unit 8 controls (switching-controls) ON and OFF of the first switching element 4a and the second switching element 4b to thereby control a direct-current voltage supplied to the load 11. The switching control of the first switching element 4a and the second switching element 4b by the control unit 8 is explained with reference to FIGS. 1 to 3.

Figure 2:
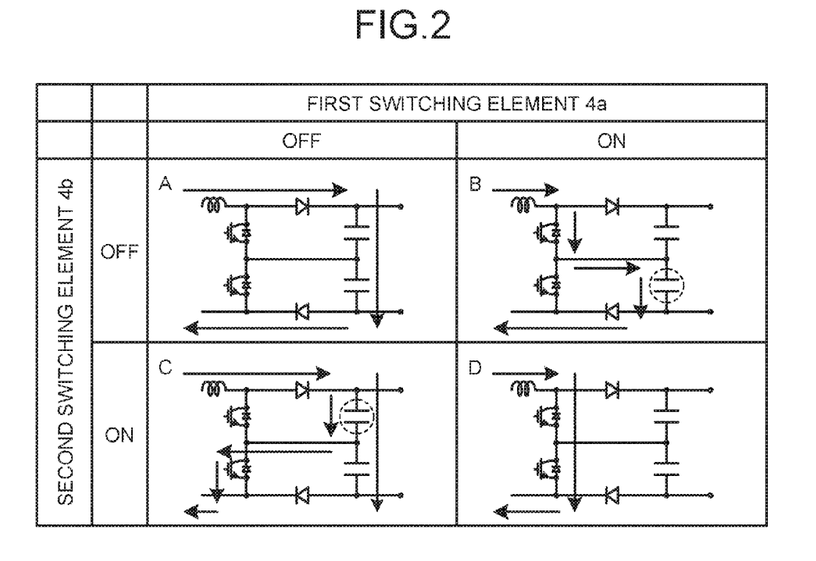
FIG. 2 is a diagram showing an example of a switching control state in the direct-current power supply device according to the first embodiment.

FIG. 2 is a diagram showing an example of a switching control state in the direct-current power supply device 100 of this embodiment. Note that, in FIG. 2, for simplification of the figure, signs of components are omitted.

A state A shown in FIG. 2 shows a state in which both of the first switching element 4a and the second switching element 4b are OFF-controlled (controlled to be OFF by the control unit 8). In this state, charging of the first capacitor 6a and the second capacitor 6b is performed.

A state B shown in FIG. 2 shows a state in which the first switching element 4a is ON-controlled (controlled to be ON by the control unit 8) and the second switching element 4b is OFF-controlled. In this state, charging of only the second capacitor 6b is performed.

A state C shown in FIG. 2 shows a state in which the second switching element 4b is ON-controlled and the first switching element 4a is OFF-controlled. In this state, only the first capacitor 6a is charged.

A state D shown in FIG. 2 shows a short-circuit state in which both of the two switching elements 4a and 4b are ON-controlled. In this state, charging of neither the first capacitor 6a nor the second capacitor 6b is performed.

In this embodiment, by switching the states shown in FIG. 2, a rush current in which an electric current flowing from the alternating-current power supply 1 steeply increases is suppressed while controlling the direct-current voltage supplied to the load 11.

Figure 3:
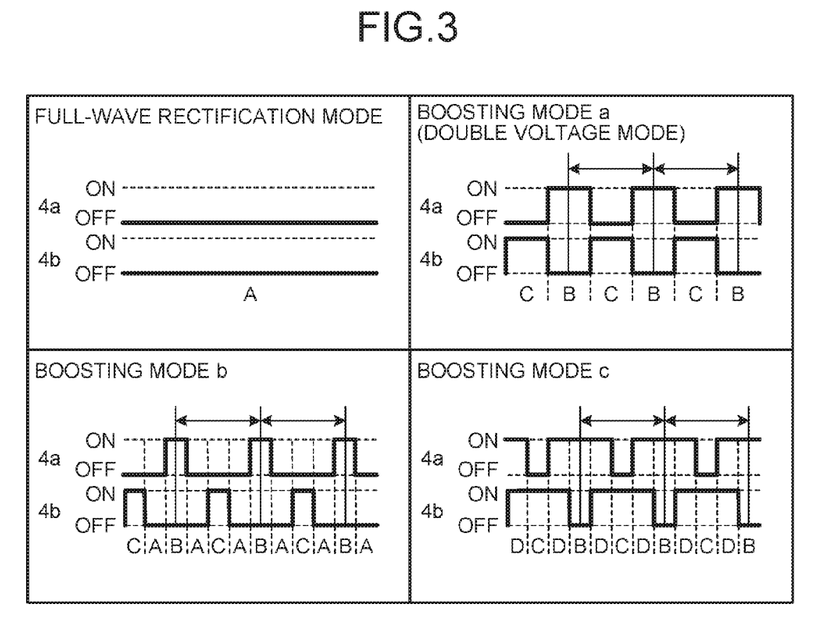
FIG. 3 is a diagram showing operation modes in the direct-current power supply device according to the first embodiment.

FIG. 3 is a diagram showing operation modes in the direct-current power supply device 100 of this embodiment. As shown in FIG. 3, the direct-current power supply device 100 of this embodiment has, as the operation modes, a full-wave rectification mode (a first mode) in which the first switching element 4a and the second switching element 4b are always set in an OFF control state and a boosting mode (a second mode) in which the first switching element 4a and the second switching element 4b are alternately ON-controlled.

As the boosting mode, there are three kinds of a boosting mode "a", a boosting mode "b", and a boosting mode "c". In the boosting mode "a", both of on-duties of the first switching element 4a and the second switching element 4b are 50%. In the boosting mode "b", both of the on-duties of the first switching element 4a and the second switching element 4b are smaller than 50%. In the boosting mode "c", both of the on-duties of the first switching element 4a and the second switching element 4b is larger than 50%.

In the full-wave rectification mode, the first switching element 4a and the second switching element 4b are always set in the OFF control state. Therefore, a voltage full-wave-rectified by the rectifier circuit 2 becomes an output voltage of the direct-current power supply device 100.

In the boosting mode "a", ON timing of the first switching element 4a and OFF timing of the second switching element 4b are substantially simultaneous. OFF timing of the first switching element 4a and ON timing of the second switching element 4b are substantially simultaneous. Therefore, in the boosting mode "a", the state B and the state C shown in FIG. 2 are repeated. An output voltage at this point is approximately a double of the output voltage in the full-wave rectification mode. In this way, the boosting mode "a" is a double voltage mode in which the output voltage is approximately a double of the output voltage in the full-wave rectification mode.

In the boosting mode "b", a period in which one of the first switching element 4a and the second switching element 4b is ON and a simultaneous OFF period in which the both of the first switching element 4a and the second switching element 4b are OFF are provided. In the boosting mode "b", a state transition of the state B→the state A→the state C→the state A is cyclically repeated. An output voltage at this point is an intermediate voltage between the output voltage in the full-wave rectification mode and the output voltage in the boosting mode "a" (the double voltage mode).

In the boosting mode "c", a period in which one of the first switching element 4a and the second switching element 4b is ON and a period in which the both of the first switching element 4a and the second switching element 4b are ON are provided. In the boosting mode "c", a state transition of the state D→the state C→the state D→the state B is cyclically repeated. In the period in which both of the first switching element 4a and the second switching element 4b are ON (a period of the state D), energy is stored in the reactor 3. An output voltage at this point is a voltage equal to or larger than the output voltage in the boosting mode "a" (the double voltage mode).

In this way, in this embodiment, by changing the on-duties of the first switching element 4a and the second switching element 4b, it is made possible to control the direct-current voltage supplied to the load 11.

This embodiment has an object of continuing the operation of the direct-current power supply device and preventing a secondary failure when a short-circuit failure of one of the first switching element 4a and the second switching element 4b configuring the switching unit 7 has occurred.

When the short-circuit failure of one of the first switching element 4a and the second switching element 4b occurs, one of the state B and the state C shown in FIG. 2 cannot be realized. This is because turning-on of the switching element that is not in a short-circuit failure is synonymous with turning-on of both of the first switching element 4a and the second switching element 4b, and the state of the first switching element 4a and the second switching element 4b changes to the state D.

Figure 4:
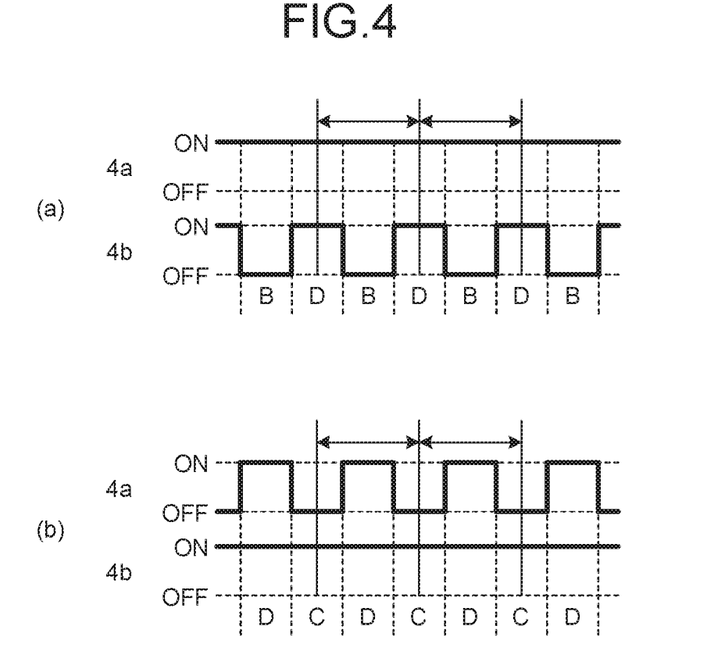
FIG. 4 is a diagram showing a switching operation waveform in the case of a short-circuit failure of one of a first switching element and a second switching element.

FIG. 4 is a diagram showing a switching operation waveform in the case of a short-circuit failure of one of the first switching element 4a and the second switching element 4b. FIG. 4 shows an example in which a short-circuit failure of one of the first switching element 4a and the second switching element 4b has occurred in the boosting mode "a" shown in FIG. 3. FIG. 4(a) is an operation waveform at the time when a short-circuit failure of the first switching element 4a has occurred. FIG. 4(b) is an operation waveform at the time when a short-circuit failure of the switching element 4b has occurred.

As shown in FIG. 4, for example, when the short-circuit failure of the first switching element 4a occurs, a period that originally is the state C changes to the state D. When the short-circuit failure of the second switching element 4b occurs, a period that originally is the state B changes to the state D. Depending on ON-time of the switching element not in the short-circuit failure, if an input current from the power supply 1 is small and is equal to or smaller than an electric current for a current protection operation for the switching elements (the first switching element 4a and the second switching element 4b), the direct-current power supply device continues to operate in a state in which one switching element is in the short-circuit failure.

When a combined operation of the state B and the state D or the state C and the state D is performed as shown in FIG. 4, a problem is a charge shortage that occurs in one of the first capacitor 6a and the second capacitor 6b connected in series. When the combined operation of the state B and the state D or the state C and the state D is performed as shown in FIG. 4, electric charges are supplied to the load 11 from the capacitors. That is, the capacitors are discharging. However, if the state B or the state C is not present, charging to one of the first capacitor 6a and the second capacitor 6b cannot be performed.

Therefore, when a short-circuit failure of one of the first switching element 4a and the second switching element 4b occurs, charging to one of the second capacitor 6b and the first capacitor 6a is not executed, and only discharging is executed. Therefore, this capacitor falls into an un-dischargeable state due to a charge shortage as time elapses.

Therefore, in this embodiment, the direct-current-voltage detecting unit 10 detects both of a voltage across the first capacitor 6a and a voltage across the second capacitor 6b. The detection of the voltage across the first capacitor 6a can be, for example, a method of directly detecting the voltage with a differential amplifier such as an operational amplifier, or can be a method of indirectly detecting the voltage across the first capacitor 6a by subtracting the voltage across the second capacitor 6b from a voltage across the series circuit including the first capacitor 6*a* and the second capacitor 6*b*. Methods other than these methods can also be adopted.

If a voltage difference between the voltage across the first capacitor 6*a* and the voltage across the second capacitor 6*b* is observed, it is possible to detect that only one of the first capacitor 6*a* and the second capacitor 6*b* is not charged, in other words, the voltage difference becomes imbalanced and a potential difference has a large difference. By detecting the voltage imbalance, it is possible to detect that a short-circuit failure of one of the first switching element 4*a* and the second switching element 4*b* has occurred.

Figure 5:
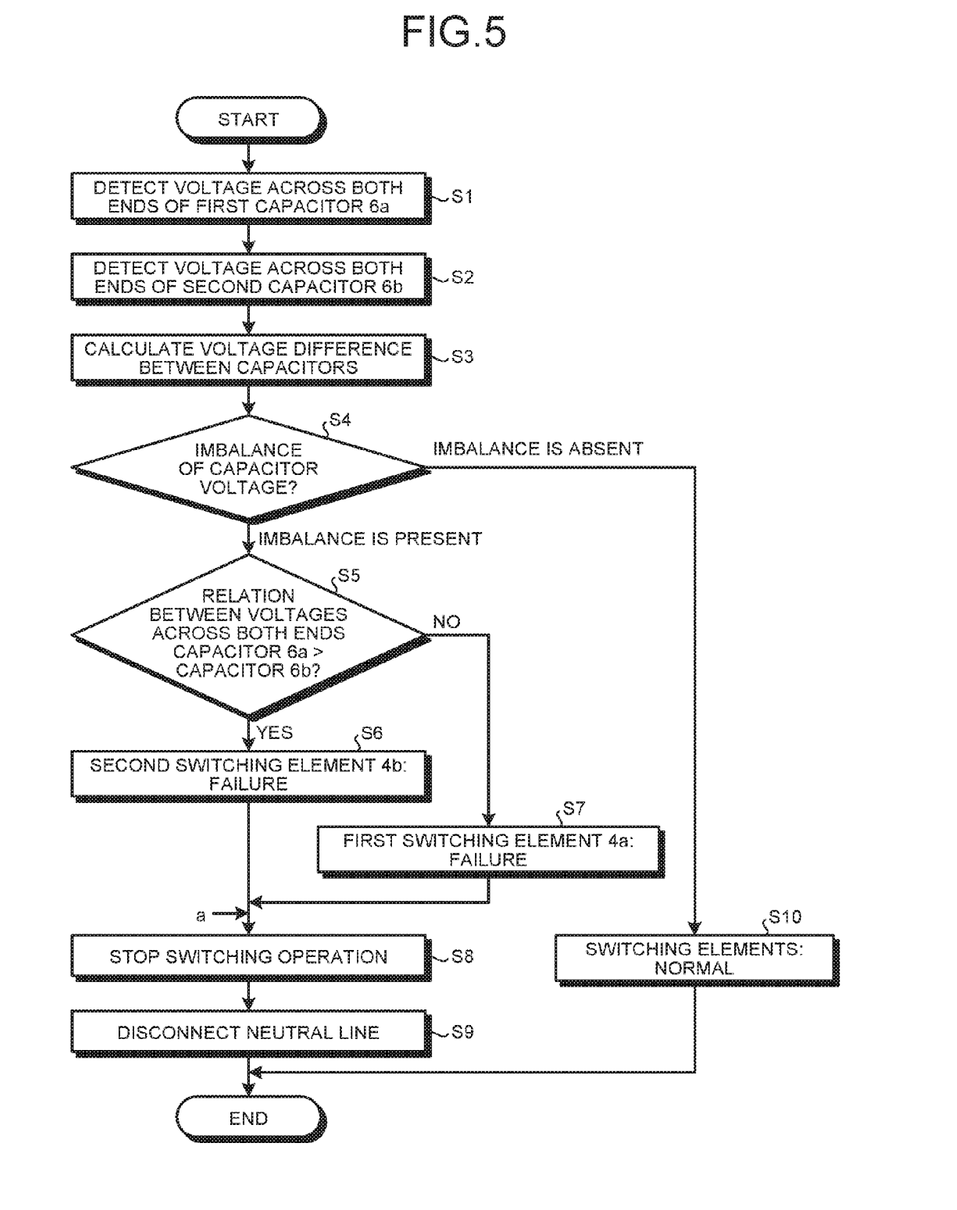
FIG. 5 is a flowchart for explaining an example of a failure detection method for the switching elements in the first embodiment.

FIG. 5 is a flowchart for explaining an example of a failure detection method for the switching elements of this embodiment. The direct-current-voltage detecting unit 10 detects the voltage across the first capacitor 6*a* (step S1) and detects the voltage across the second capacitor 6*b* (step S2). In FIG. 5, steps S1 and S2 are performed in this order. However, the step S1 and step S2 can be simultaneously performed or can be performed in the order of step S2 and step S1. The control unit 8 acquires the voltage across the first capacitor 6*a* and the voltage across the second capacitor 6*b* from the direct-current detection unit and calculates a voltage difference between the voltages (step S3).

The control unit 8 determines on the basis of the voltage difference whether imbalance is present between the voltage across the first capacitor 6*a* and the voltage across the second capacitor 6*b* (step S4). Specifically, for example, the control unit 8 determines whether imbalance is present by determining whether the voltage difference is equal to or more than a fixed value. If the imbalance is present (imbalance is present at step S4), the control unit 8 determines whether the voltage across the first capacitor 6*a* is higher than the voltage across the second capacitor 6*b* (step S5). If the voltage across the first capacitor 6*a* is higher the voltage across the second capacitor 6*b* (Yes at step S5), the control unit 8 determines that a failure of the second switching element 4*b* has occurred (step S6). The control unit 8 then stops switching operations of both of the first switching element 4*a* and the second switching element 4*b* (step S8) and instructs the neutral-line disconnecting unit 20 to perform disconnection. The neutral-line disconnecting unit 20 disconnects connection between a connection point of the first switching element 4*a* and the second switching element 4*b* and a connection point of the first capacitor 6*a* and the second capacitor 6*b* (step S9). At step S8, instead of stopping the switching operations, only the un-failed switching element may be changed to a state of operation OFF, and by further performing the disconnection at step S9, thereafter, the switching elements may be operated in the full-wave rectification mode (the state A in FIG. 2).

If the voltage across the first capacitor 6*a* is not higher than the voltage across the second capacitor 6*b* (No at step S5), the control unit 8 determines that a failure of the first switching element 4*a* has occurred (step S7) and proceeds to step S8. If determining at step S4 that the imbalance is absent (imbalance is absent at step S4), the control unit 8 determines that the switching elements are normal (step S10) and continues operation.

As explained above, when the un-failed switching element performs the ON operation, the switching elements comes into the power supply short-circuit state (the state D in FIG. 2). Therefore, when a short-circuit current increases, a not-shown current protection function for the switching elements operates. The state D of the short circuit is allowed if the state D is in a level that does not cause a current breakage of the switching elements. However, the switching operation is stopped for protection of the un-failed switching element.

For the neutral-line disconnecting unit 20, for example, a relay can be used. On the other hand, when the relay is turned off in a state in which an electric current flows, arc is generated, a contact point melts, and the relay sometimes cannot be turned off. Therefore, the un-failed switching element is operated to turn off the relay. If the switching elements are operating, because the switching elements are in the state D, an electric current does not flow to a neutral line (a connection line that connects the connection point of the first switching element 4*a* and the second switching element 4*b* and the connection point of the first capacitor 6*a* and the second capacitor 6*b*). Therefore, no arc is generated and the relay can be turned off. If the neutral line is disconnected, the switching elements do not come into the state D. Therefore, if the un-failed switching element is kept off, this is synonymous with the state A shown in FIG. 2, and it is made possible to leave a deficient state in which only one capacitor cannot be charged. By setting both of the switching elements in the OFF state, it is made possible to cause the switching elements to perform an operation same as the normal full-wave rectification. There is no limitation on the timing when the processing shown in FIG. 5 is carried out. However, for example, the processing can be periodically carried out or can be carried out when a mode is changed. Because influence due to a failure of the switching elements is different depending on the mode, a frequency of carrying out the processing shown in FIG. 5 can be changed according to the mode.

Figure 6:
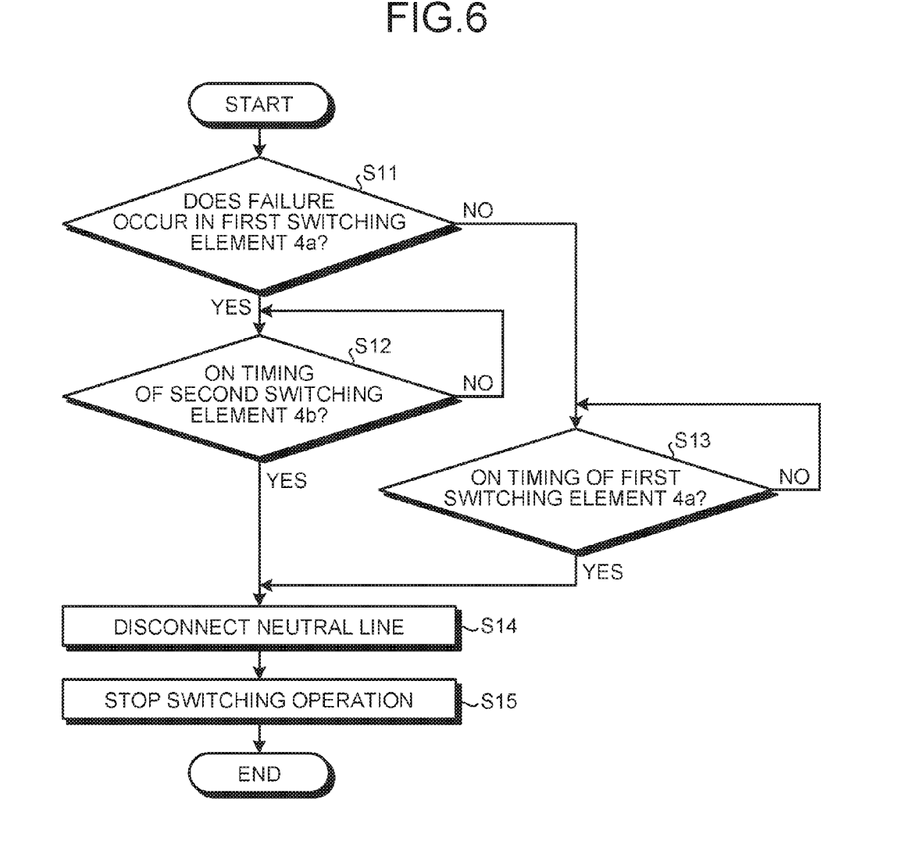
FIG. 6 is a flowchart for explaining an example of a procedure for operating the un-failed switching element and turning off a relay.

FIG. 6 is a flowchart showing an example of a procedure for operating the un-failed switching element and turning off the relay. The operation shown in FIG. 6 is carried out instead of steps S8 and S9 of FIG. 5. That is, an "a" point shown in FIG. 5 is a start point of the flowchart of FIG. 6. Thereafter, the operation shown in FIG. 6 is carried out instead of steps S8 and S9.

As shown in FIG. 6, first, the control unit 8 determines whether the failed switching element is the first switching element 4*a* (step S11). If the failed switching element is the first switching element 4*a* (Yes at step S11), the control unit 8 determines whether it is the timing when the second switching element 4*b* is on (step S12). If it is the timing when the second switching element 4*b* is on (Yes at step S12), the control unit 8 instructs the neutral-line disconnecting unit 20 to perform disconnection. The neutral-line disconnecting unit 20 disconnects the neutral line (step S14). The control unit 8 stops the operation of the switching elements (step S15) or operates the switching elements in the full-wave rectification mode.

If it is not the timing when the second switching element 4*b* is on (No at step S12), the control unit 8 repeats step S12 and stays on standby until the timing when the second switching element 4*b* is on. If the failed switching element is not the first switching element 4*a* (No at step S11), the control unit 8 determines whether it is timing when the first switching element 4*a* is on (step S13). If it is the timing when the first switching element 4*a* is on (Yes at step S13), the control unit 8 proceeds to step S14. If it is not the timing when the first switching element 4*a* is on (No at step S13), the control unit 8 repeats step S13 and stays on standby until the timing when the first switching element 4*a* is on.

When the procedure shown in FIG. 5 is used, it is possible to immediately protect the switching elements without generating the power supply short-circuit state (the state D). On the other hand, when the procedure shown in FIG. 6 is used, an inexpensive relay can be applied as the neutral-line disconnecting unit 20. If a short-circuit current in the power supply short-circuit state (the state D) is smaller than an electric current for the protection operation for the switching elements, it is made possible to surely disconnect the neutral line by causing the neutral-line disconnecting unit 20 to disconnect the neutral line when an electric current does not flow. Consequently, it is possible to maintain the full-wave rectification (the state A) irrespective of a failure of the switching elements. Therefore, it is possible to realize protection with high reliability.

As explained above, in this embodiment, it is made possible to detect the failed switching element by detecting the respective voltages across the two capacitors and detecting a voltage difference therebetween. Consequently, it is possible to provide the direct-current power supply device with high reliability, which is in the full-wave rectification state but can continue an operation even after a failure of the switching elements. In particular, it is possible to prevent damage from spreading by always performing detection in the double voltage mode in which the switching elements perform a switching operation. By causing the neutral-line disconnecting unit 20 to disconnect the neutral line in a state in which the un-failed switching element is on, it is possible to provide a highly reliable protection sequence processing, in which the neutral line can be disconnected without generating arc.

Second Embodiment

Figure 7:
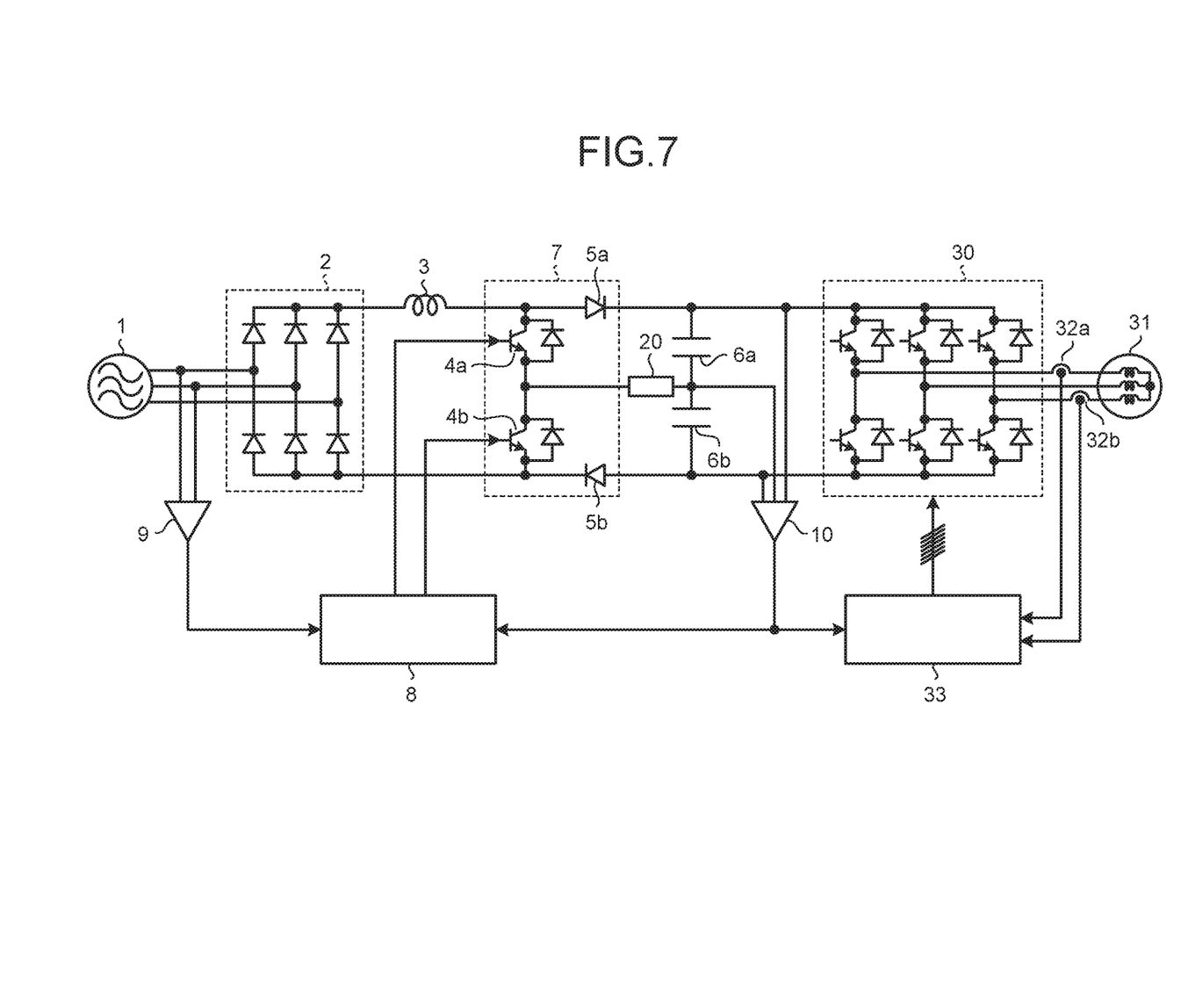
FIG. 7 is a circuit block diagram showing a configuration example of a motor driving device according to a second embodiment.

FIG. 7 is a circuit block diagram showing a configuration example of a motor driving device according to a second embodiment of the present invention. In FIG. 7, components performing operations same as the operations in the circuit configuration shown in FIG. 1 are denoted by reference numerals and signs same as the reference numerals and signs in the first embodiment. Redundant explanation of the components is omitted. The motor driving device shown in FIG. 7 includes the direct-current power supply device 100 according to the first embodiment. The load 11 shown in FIG. 1 corresponds to an inverter 30 and an electric motor 31 shown in FIG. 7. The inverter 30 is connected to both ends of a series circuit configured by the first capacitor 6a and the second capacitor 6b. A direct-current voltage is input to the inverter 30.

The motor driving device according to this embodiment includes a current detector 32 and a driving control unit 33 in addition to the direct-current power supply device 100 according to the first embodiment. The current detector 32 (32a and 32b) detects an electric current flowing to the electric motor 31. The driving control unit 33 controls the inverter 30 on the basis of an electric current detected by the current detector 32 and a direct-current voltage detected by the direct-current-voltage detecting unit 10.

The electric motor 31 is controlled to be driven by the inverter 30. Therefore, a driving operation range of the electric motor 31 changes according to a direct-current voltage input to the inverter 30. In particular, when the electric motor 31 is an electric motor in which a permanent magnet is used in a rotor, a direct current of the electric motor 31 also affects a magnetic characteristic of the permanent magnet used in the rotor.

A permanent magnet motor in which, for example, a rare-earth magnet having strong magnetism is used as the material of a permanent magnet is applied. Torque is generated with a small electric current because the rare-earth magnet has strong magnetism. Therefore, the rare-earth magnet is applied to the electric motor 31 used in an apparatus in which energy saving is requested. However, because the rare-earth magnet is rare metal called rare earth, it is difficult to acquire the rare-earth magnet. In a permanent magnet motor in which the rare-earth magnet is not used and a magnet such as ferrite having weaker magnetism than the rare-earth magnet is used, at the same electric current, output torque is small compared with when the rare-earth magnet is used. Therefore, in the permanent magnet motor including the magnet such as ferrite having weak magnetism, an electric current is increased by a decreased amount in the magnet magnetism to supplement the torque. Alternatively, because the output torque is proportional to an electric current× the number of windings of a wire, the number of windings is increased to supplement the output torque without increasing the electric current. When the electric current is increased, a copper loss of the electric motor 31 and a conduction loss in the inverter 30 increase.

When the number of windings is increased without increasing the electric current to avoid the increase in the losses, an induced voltage corresponding to the number of revolutions of the electric motor 31 increases. The inverter 30 needs a direct-current voltage higher than the induced voltage. Therefore, when the number of windings is increased, it is necessary to increase the direct-current voltage.

Therefore, in this embodiment, in the motor driving device, the direct-current power supply device 100 explained in the first embodiment is used as the direct-current power supply device that supplies electric power to the inverter 30 that drives the electric motor 31. Consequently, it is made possible to supply plural kinds of direct-current voltages such as the full-wave rectification state, the double voltage rectification state, and the like to the inverter 30. Therefore, when an electric motor in which the number of windings is increased without using the rare-earth magnet is used as the electric motor 31, it is possible to supply a direct-current voltage suitable for the electric motor 31. Therefore, it is possible to drive the electric motor 31 without increasing a loss of the electric motor 31 in which the rare-earth magnet is not used.

By using the direct-current power supply device 100 according to the first embodiment, an appropriate voltage is applied to the electric motor 31 in accordance with an operation state (a load amount) of the electric motor 31, and thus, a driving operation with high efficiency is made possible. Specifically, the driving control unit 33 grasps an operation state of the electric motor 31 on the basis of an electric current detected by the current detector 32 and indicates a voltage to the control unit 8 on the basis of the operation state. The control unit selects a mode (the full-wave rectification mode, the boosting mode "a", the boosting mode "b", or the boosting mode "c") of the switching unit 7 so as to set a voltage to the indicated voltage and operates the switching unit 7 in the selected mode.

In particular, in the electric motor 31 in which the magnet such as ferrite magnet having small magnetism compared with rare earth magnet is used, because an appropriate voltage is applied in accordance with an operation state, it is made possible to suppress an increase in a loss and realize a driving operation with high efficiency. Therefore, the direct-current power supply device 100 is suitable as a direct-current power supply device for an inverter that drives the permanent magnet motor of ferrite or the like.

Further, a MOSFET called "MOSFET of a super junction structure" is used in one or more of the elements (the first switching element 4a, the second switching element 4b, the first backflow preventing element 5a, the second backflow preventing element 5b, and the rectifier element configuring the rectifier circuit 2) configuring the direct-current power supply device according to this embodiment and the switching elements of the inverter 30. Consequently, it is made possible to realize a further reduction in a loss, and thus it is also made possible to provide a highly efficient direct-current power supply device. Note that the super junction structure is a structure having a P layer deeper than a normal MOSFET, and it is known that the deep P layer is in widely contact with an n layer, thereby having high voltage resistance while having low ON resistance.

It goes without saying that it is possible to provide the direct-current power supply device having a lower loss even when at least one of the elements configuring the direct-current power supply device according to this embodiment and the switching elements of the inverter 30 is configured by a wide band gap semiconductor such as GaN (gallium nitride), SiC (silicon carbide), and diamond. Further, the voltage resistance increases and allowable current density also increases because the wide band gap semiconductor is used. Therefore, it is possible to reduce the size of the MOSFET. It is possible to reduce the size of a semiconductor module incorporating these elements. Because heat resistance is also high, it is also possible to reduce the size of heat radiation fins of a heat sink. Further, the wide band gap semiconductor has a higher withstand voltage than the conventional silicon (Si) semiconductor and dominantly acts on an increase in a voltage. Therefore, by configuring the direct-current power supply device or the inverter 30 having a low loss and a high voltage, it is made possible to further derive characteristics of the wide band gap semiconductor.

As explained above, in this embodiment, the example is explained in which the direct-current power supply device 100 according to the first embodiment is applied to the motor driving device. In the motor driving device according to this embodiment, it is possible to appropriately control, according to the configuration (the type of the permanent magnet, the number of windings, etc.) and an operation state of the electric motor 31, a voltage supplied to the inverter 30 that controls to drive the electric motor 31. Consequently, even when the electric motor 31 including the magnet such as ferrite magnet having small magnetism compared with the rare earth magnet is controlled to be driven, it is possible to suppress a loss and realize an efficient driving operation. When one of the first switching element 4a and the second switching element 4b fails, it is possible to obtain effects same as the effects described in the first embodiment.

Third Embodiment

Figure 8:
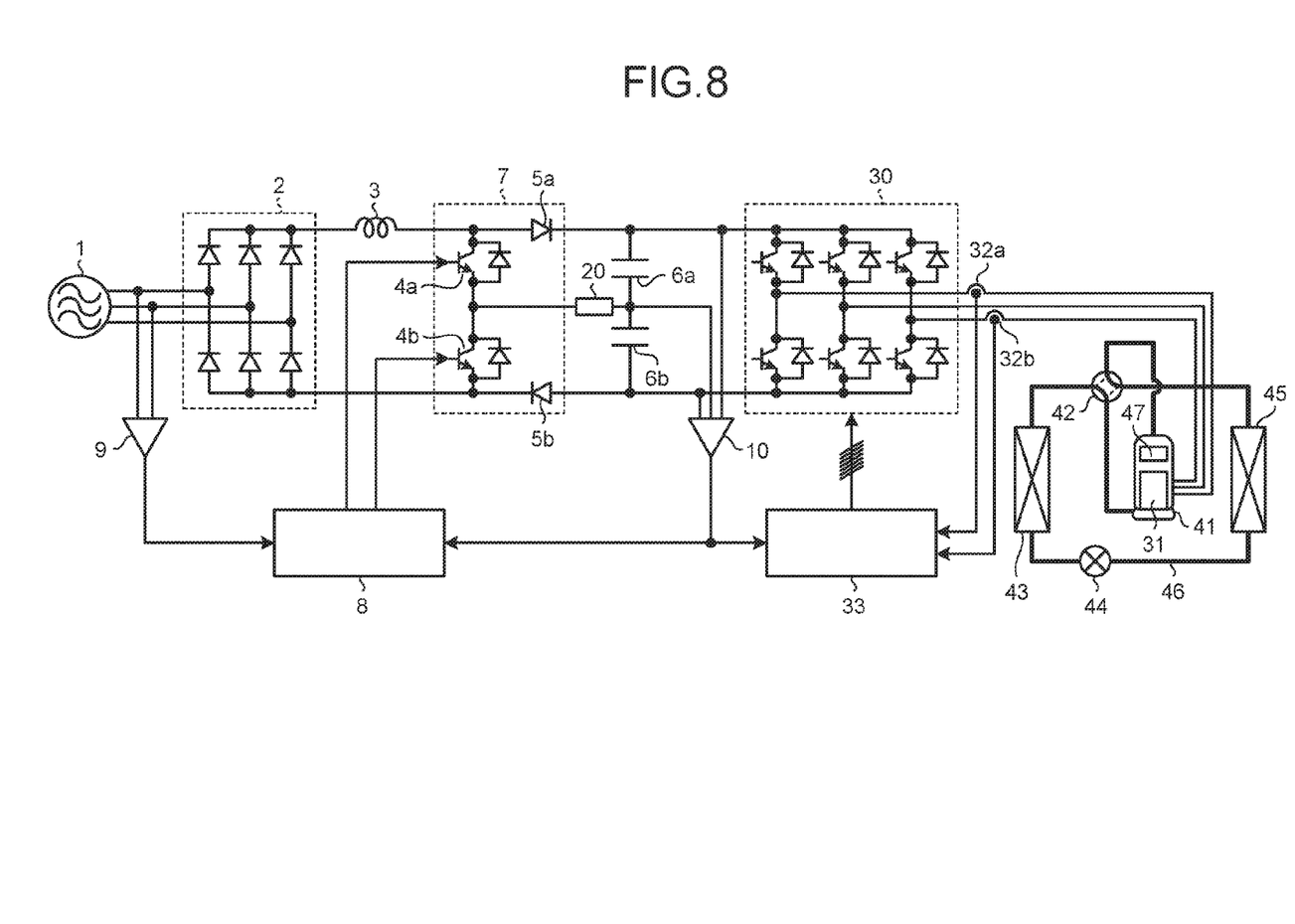
FIG. 8 is a circuit block diagram showing a configuration example of an air conditioner according to a third embodiment.

FIG. 8 is a circuit block diagram showing a configuration example of an air conditioner according to a third embodiment of the present invention. The air conditioner according to this embodiment includes the motor driving device explained in the second embodiment. The air conditioner according to this embodiment includes a refrigeration cycle to which a compressor 41 incorporating the electric motor 31 in the second embodiment, a four-way valve 42, an outdoor heat exchanger 43, an expansion valve 44, and an indoor heat exchanger 45 are attached via a refrigerant pipe 46. The air conditioner configures a separate type air conditioner.

A compressing mechanism 47 that compresses a refrigerant and the electric motor 31 that operates the compressing mechanism 47 are provided inside the compressor 41. The refrigerant circulates between the heat exchangers 43 and 45 from the compressor 41, whereby the refrigeration cycle that performs cooling and heating and the like is established. The circuit block shown in FIG. 8 can be applied to not only the air conditioner but also apparatuses including the refrigeration cycle such as a refrigerator and a freezer.

With the refrigeration cycle, the air conditioner that performs cooling and heating changes to a stable state when a room temperature approaches a set temperature preset by a user. The inverter 30 operates to rotate the electric motor 31 mounted on the compressor 41 at low speed. Therefore, because the low speed rotation is continued for a long time in the air conditioner, efficiency improvement during low-speed operation considerably contributes to energy saving. Consequently, when an electric motor including a rare-earth magnet or a permanent magnet with an increased number of windings and weak magnetism for reducing an electric current is used for the electric motor 31, the electric motor contributes to energy saving.

On the other hand, when the first switching element 4a or the second switching element 4b fails, if the electric motor 31 is not operated, the air conditioner does not work. In particular, when the first switching element 4a or the second switching element 4b fails in the middle of summer or the middle of winter, influence on a human body such as heatstroke is large. Besides, in the case of a refrigerator and a showcase, it is likely that foods stored inside go bad.

In this embodiment, as in the first embodiment, when the first switching element 4a or the second switching element 4b fails, the failure is detected to cause the neutral-line disconnecting unit 20 to disconnect the neutral line. Consequently, the direct-current power supply device can operate for only the full-wave rectification. Consequently, although an operation in high-speed rotation for increasing an induced voltage of the electric motor 31 cannot be performed, an operation in low-speed rotation can be continued.

Therefore, when a failure of the first switching element 4a or the second switching element 4b is detected, the air conditioner according to this embodiment can notify the user with alarm or the like and perform emergency operation only in the low-speed rotation until the switching element is repaired. Consequently, even if the switching element fails in the middle of summer or the middle of winter, it is possible to realize the emergency operation. It is possible to eliminate the influence on a human body as much as possible. When the circuit block shown in FIG. 8 is applied to the refrigerator and the showcase, it is possible to secure time before foods go bad, and thus it is possible to suppress damage due to a failure.

Figure 9:
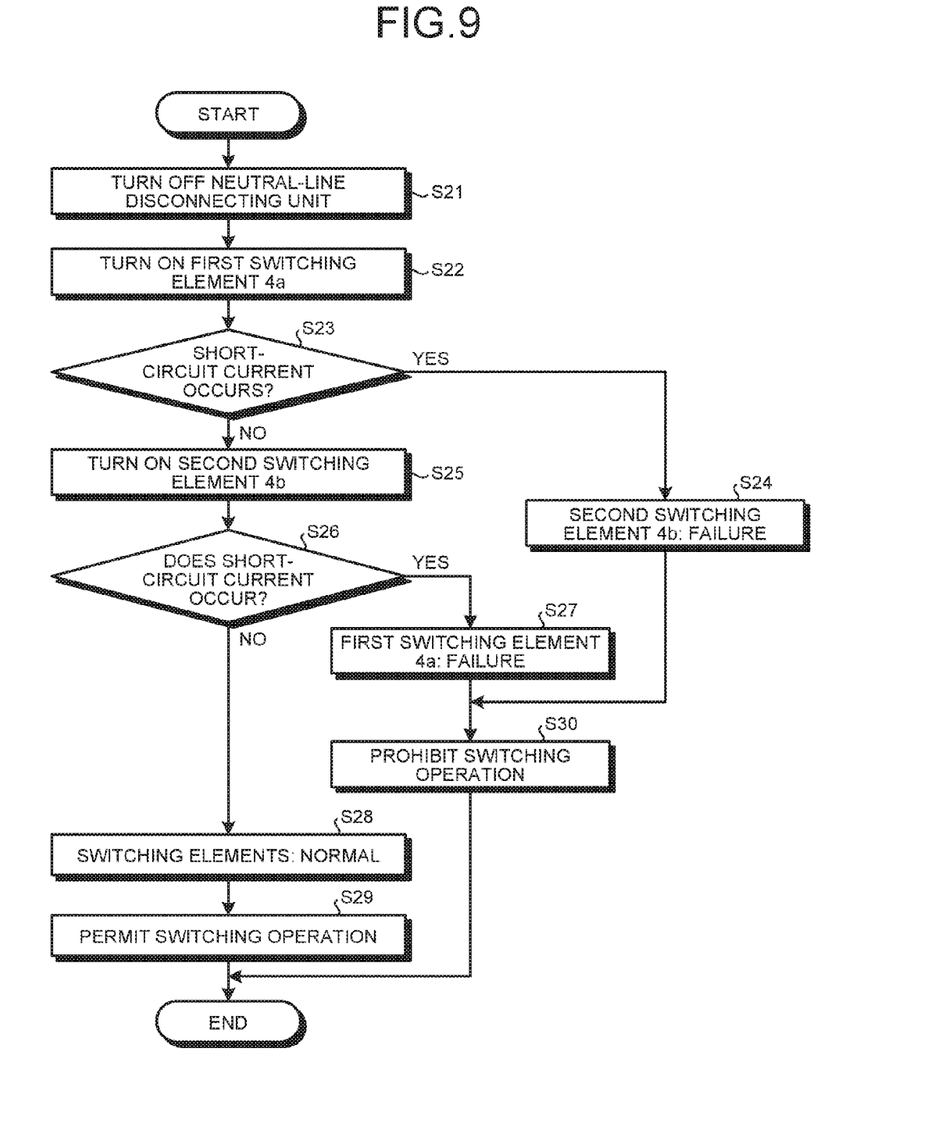
FIG. 9 is a flowchart for explaining an example of a failure detection procedure before a start of a direct-current power supply device.

In the air conditioner according to this embodiment, it is also possible to detect a failure of the first switching element 4a or the second switching element 4b during the start of the direct-current power supply device 100 (i.e., before the start of the switching operation of the first switching element 4a or the second switching element 4b). FIG. 9 is a flowchart for explaining an example of a failure detection procedure before the start of the direct-current power supply device 100. First, in the case of a short-circuit failure of both of the first switching element 4a and the second switching element 4b, when the direct-current power supply device 100 is started, a power supply short-circuit occurs. The first switching element 4a and the second switching element 4b are protected by shutoff of a not-shown breaker or fuse melting such that an electric current is not supplied from the alternating-current power supply 1.

As shown in FIG. 9, the neutral-line disconnecting unit 20 is set in an OFF (disconnected) state first, and energization from the alternating-current power supply 1 is started (step S21). Thereafter, the control unit 8 turns on the first switching element 4a (step S22). In this state, the control unit 8 determines whether a short-circuit current flows from the alternating-current power supply 1 (step S23). If the short-circuit current does not flow (No at step S23), the control unit 8 determines that the first switching element 4a has not failed. The control unit 8 turns off the first switching element 4a and turns on the second switching element 4b (step S25). In this state, the control unit 8 determines whether the short-circuit current flows from the power supply 1 (step S26). If the short-circuit current does not flow (No at step S26), the control unit 8 determines that both of the switching elements are normal (step S28), and permits implementation of a normal switching operation (step S29).

If the short-circuit current flows at step S23 (Yes at step S23), the control unit 8 determines that the second switching element 4b has failed (step S24). The control unit 8 prohibits the implementation of the normal switching operation (step S30). Alternatively, the control unit 8 permits only emergency operation (the full-wave rectification mode). If the short-circuit current flows at step S26 (Yes at step S26), the control unit 8 determines that the first switching element 4a has failed (step S27) and proceeds to step S30.

A detection method for the short-circuit current from the alternating-current power supply 1 is not illustrated in FIGS. 1, 7, and 8. However, the detection method can be a method of winding a secondary winding wire around the reactor 3 and detecting an induced voltage of the secondary winding wire or can be a method of providing a current sensor between the switching unit 7 and the rectifier 2 and detecting the short-circuit current. The detection method can be other detection methods. When the secondary winding wire is wound around the reactor 3 to detect the induced voltage of the secondary winding wire, the reactor 3 has a function of a short-circuit-current detecting unit. When the current sensor is provided between the switching unit 7 and the rectifier 2 to detect the short-circuit current, the current sensor functions as the short-circuit-current detecting unit. Note that, when both of the switching elements simultaneously fail, as explained above, the switching elements are protected by the fuse or the breaker.

Improvement of efficiency can be realized in a motor driving device including a direct-current power supply device capable of boosting a direct-current voltage to a double. On the other hand, components likely to fail because of addition of switching elements increase. However, if the direct-current power supply device 100 explained in the first embodiment is used, even if the switching elements fail, the switching elements do not fall into an operation failure. By setting a failure part and setting the operation of the electric motor 31 in the low-speed rotation operation, it is possible to cause the switching elements to continue the operation.

As explained in the second embodiment, the air conditioner according to this embodiment can efficiently control to drive the electric motor 31 including a permanent magnet with an increased number of windings and weak magnetism even if a rare-earth magnet, which is rare metal, is not used. Therefore, when the electric motor 31 including the permanent magnet with the increased number of windings and the weak magnetism is used, it is also possible to realize energy saving. The air conditioner according to this embodiment can detect a failure of the switching elements even during normal operation or before starting. Therefore, it is possible to continue an operation through emergency operation.

In particular, when the motor driving device according to the second embodiment is applied to an apparatus that always operates for twenty-four hours like a refrigerator, because operation in a low-current state in low-speed rotation is long, it is possible to realize energy saving at low costs with the electric motor 31 to which a ferrite magnet or the like with an increased number of windings is applied.

INDUSTRIAL APPLICABILITY

As explained above, the direct-current power supply device according to the present invention can be used in a power supply device for a load that performs power consumption with a direct current, and can be used particularly as a power supply device for an inverter that requires a direct-current power supply device. Besides realization of energy saving through application to an inverter that drives a permanent magnet motor, it is possible to configure an inexpensive motor driving device with a high energy saving property without using a rare-earth magnet, which is rare metal. Therefore, the direct-current power supply device can also be applied to domestic electric appliances in general such as a refrigerator, a dehumidifier, a heat-pump type water heater, a showcase, and a vacuum cleaner besides an air conditioner, a freezer, and a washer drier. The direct-current power supply device can also be applied to a fan motor, a ventilation fan, a hand drier, an electromagnetic induction heating cooker, and the like.

The invention claimed is:

1. A direct-current power supply device comprising:
   a rectifier connected to an alternating-current power supply;
   a charge storage unit including a first capacitor and a second capacitor connected in series;
   a switching unit including a first switching element and a second switching element connected in series and backflow preventing elements that suppress a backflow of electric charges from the charge storage unit;
   a control unit that controls operations of the first switching element and the second switching element;
   a direct-current-voltage detecting unit that detects a first both-end voltage, which is a voltage across the first capacitor, and a second both-end voltage, which is a voltage across the second capacitor, wherein
   the control unit detects, on the basis of a voltage difference between the first both-end voltage and the second both-end voltage, a short-circuit failure of one of the first switching element and the second switching element, and
   a short-circuit-current detecting unit that detects a short-circuit current flowing from the alternating-current power supply, wherein
   the control unit detects, before a start of a switching operation of the switching unit, on the basis of whether the short-circuit current is detected in a state in which one of the first switching element and the second switching element is turned on and the other switching element is turned off, whether a short-circuit failure of the other switching element has occurred;
   the direct-current power supply device further comprising a connection control unit that switches disconnection or connection of a first middle point, which is a middle point between the first switching element and the second switching element, and a second middle point, which is a middle point between the first capacitor and the second capacitor, wherein
   when detecting the short-circuit failure, the control unit instructs the connection control unit to disconnect the first middle point and the second middle point and operates in a state in which the switching element in which the short-circuit failure has not occurred of the first switching element and the second switching element is turned off.

2. The direct-current power supply device according to claim 1, further comprising a connection control unit that switches disconnection or connection of a first middle point, which is a middle point between the first switching element and the second switching element, and a second middle point, which is a middle point between the first capacitor and the second capacitor, wherein when detecting the short-circuit failure, the control unit instructs the connection control unit to disconnect the first middle point and the second middle point and stops an operation of the switching unit.

3. The direct-current power supply device according to claim 2, wherein, in a case in which the short-circuit failure is detected, when the switching element in which the short-circuit failure is not detected is on, the control unit instructs the connection control unit to disconnect the first middle point and the second middle point.

4. The direct-current power supply device according to claim 1, wherein at least one of the first switching element, the second switching element, the backflow preventing elements, and rectifier elements configuring the rectifier is formed by a wide band gap semiconductor.

5. The direct-current power supply device according to claim 4, wherein the wide band gap semiconductor is silicon carbide, a gallium nitride-based material, or diamond.

6. A motor driving device that drives an electric motor, the motor driving device comprising:
the direct-current power supply device according to claim 1;
an inverter that controls the electric motor using a direct current supplied from the direct-current power supply device;
a current detecting unit that detects an electric current flowing to the electric motor; and
a driving control unit that controls the inverter on the basis of the electric current detected by the current detecting unit.

7. The motor driving device according to claim 6, wherein
the driving control unit determines, on the basis of a load amount of the electric motor, a voltage of the direct current supplied to the inverter and indicates the determined voltage to the direct-current power supply device, and
the direct-current power supply device controls, on the basis of the indication from the driving control unit, the voltage of the direct current to be supplied to the inverter.

8. The motor driving device according to claim 6, wherein the electric motor includes a permanent magnet composed of a material other than a rare-earth element.

9. The motor driving device according to claim 6, wherein switching elements configuring the inverter are each formed by a wide band gap semiconductor.

10. The motor driving device according to claim 9, wherein the wide band gap semiconductor is silicon carbide, a gallium nitride-based material, or diamond.

11. An air conditioner comprising: the motor driving device according to claim 6; and
a compressor including an electric motor driven by the motor driving device.

12. A refrigerator comprising: the motor driving device according to claim 6; and a compressor including an electric motor driven by the motor driving device.

13. A direct-current power supply device comprising:
a rectifier connected to an alternating-current power supply;
a charge storage unit including a first capacitor and a second capacitor connected in series;
a switching unit including a first switching element and a second switching element connected in series and backflow preventing elements that suppress a backflow of electric charges from the charge storage unit;
a control unit that controls operations of the first switching element and the second switching element; and
a short-circuit-current detecting unit that detects a short-circuit current flowing from the alternating-current power supply, wherein
the control unit detects, before a start of a switching operation of the switching unit, on the basis of whether the short-circuit current is detected in a state in which one of the first switching element and the second switching element is turned on and the other switching element is turned off, whether a short-circuit failure of the other switching element has occurred,
the direct-current power supply device further comprising a connection control unit that switches disconnection or connection of a first middle point, which is a middle point between the first switching element and the second switching element, and a second middle point, which is a middle point between the first capacitor and the second capacitor, wherein
when detecting the short-circuit failure, the control unit instructs the connection control unit to disconnect the first middle point and the second middle point and operates in a state in which the switching element in which the short-circuit failure has not occurred of the first switching element and the second switching element is turned off.

14. The direct-current power supply device according to claim 13, wherein at least one of the first switching element, the second switching element, the backflow preventing elements, and rectifier elements configuring the rectifier is formed by a wide band gap semiconductor.

15. The direct-current power supply device according to claim 14, wherein the wide band gap semiconductor is silicon carbide, a gallium nitride-based material, or diamond.

16. A motor driving device that drives an electric motor, the motor driving device comprising:
the direct-current power supply device according to claim 13;
an inverter that controls the electric motor using a direct current supplied from the direct-current power supply device;
a current detecting unit that detects an electric current flowing to the electric motor; and
a driving control unit that controls the inverter on the basis of the electric current detected by the current detecting unit.

17. The motor driving device according to claim 16, wherein
the driving control unit determines, on the basis of a load amount of the electric motor, a voltage of the direct current supplied to the inverter and indicates the determined voltage to the direct-current power supply device, and
the direct-current power supply device controls, on the basis of the indication from the driving control unit, the voltage of the direct current to be supplied to the inverter.

18. An air conditioner comprising: the motor driving device according to claim 16; and a compressor including an electric motor driven by the motor driving device.

19. A refrigerator comprising: the motor driving device according to claim 16; and a compressor including an electric motor driven by the motor driving device.

20. The motor driving device according to claim 17, wherein the electric motor includes a permanent magnet composed of a material other than a rare-earth element.

21. The motor driving device according to claim 16, wherein switching elements configuring the inverter are each formed by a wide band gap semiconductor.

22. The motor driving device according to claim 21, wherein the wide band gap semiconductor is silicon carbide, a gallium nitride-based material, or diamond.

* * * * *